United States Patent [19]

Kinzler

[11] 4,280,747

[45] Jul. 28, 1981

[54] CONNECTION LEAD-IN PLUG

[75] Inventor: Hans Kinzler, Regensburg, Fed. Rep. of Germany

[73] Assignee: Siemens Aktiengesellschaft, Berlin & Munich, Fed. Rep. of Germany

[21] Appl. No.: 107,091

[22] Filed: Dec. 26, 1979

[30] Foreign Application Priority Data

Jan. 10, 1979 [DE] Fed. Rep. of Germany ....... 2900763

[51] Int. Cl.³ .................... H01B 17/26; H01R 9/16
[52] U.S. Cl. .................... 339/126 RS; 174/153 G
[58] Field of Search ............ 174/65 G, 152 G, 153 R, 174/153 G; 16/2; 248/56; 277/178, 212 C, 212 F; 339/94 A, 103 B, 126 R, 126 RS, 128

[56] References Cited

U.S. PATENT DOCUMENTS

| 2,225,472 | 12/1940 | Franklin | 277/178 X |
|---|---|---|---|
| 2,586,892 | 2/1952 | Weber et al. | 339/94 A X |
| 3,079,581 | 2/1963 | Klumpp, Jr. | 174/153 G X |
| 4,180,297 | 12/1979 | Abrams | 277/178 X |

FOREIGN PATENT DOCUMENTS

| 1490398 | 5/1969 | Fed. Rep. of Germany | 174/153 G |
|---|---|---|---|
| 2022835 | 11/1971 | Fed. Rep. of Germany | 174/153 G |
| 32282 | 7/1962 | Finland | 174/153 G |
| 1538622 | 7/1968 | France | 174/153 G |

*Primary Examiner*—Laramie E. Askin
*Attorney, Agent, or Firm*—Hill, Van Santen, Steadman, Chiara & Simpson

[57] ABSTRACT

An insertable connection lead-in plug member designed to close an opening while providing an access opening for wire or cable, or for a tang-shaped connector such as a plug. The plug member is externally cylindrical and hollow forming a cylindrical sealing ring which is closed on one axial end face. The external periphery is axially stepped from the one end from a larger to a smaller diameter and is thereafter conically tapered to a second axial end.

3 Claims, 5 Drawing Figures

U.S. Patent  Jul. 28, 1981  4,280,747
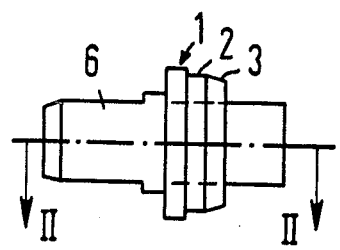
FIG 1
FIG 4
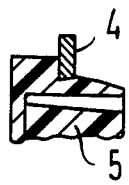
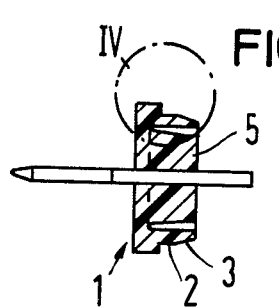
FIG 2
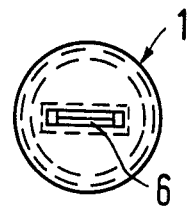
FIG 3
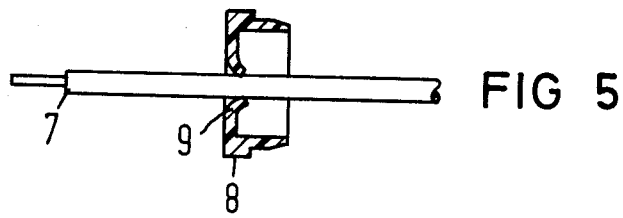
FIG 5

CONNECTION LEAD-IN PLUG

BACKGROUND OF THE INVENTION

1. Field of the Invention

This invention relates to lead-in plugs and particularly liquid tight plugs intended for installation in a bore of a housing wall to seal the bore while providing access through the wall for cable or wire or for tang-like plugs which are to be connected to electrical devices housed within the housing defined by the wall, and particularly for installations where the housing is to be filled with a casting resin.

2. Prior Art

Various methods and means for connecting electrical apparatus housed in housings which are not filled with casting compound are known. For example, when using stranded or cable conductors, generally the conductor is guided over the housing upper edge and secured to the lateral wall of the housing. In the case of large plastic housings, holes may be drilled in the housing wall. The stranded conductors are then pulled or threaded through the drilled holes and cemented into the housing interior. On the other hand, small plastic housings which are fabricated in large numbers may be provided with bores which have elastic sealing lips injected in place. Such constructions, however, require very high initial tooling costs.

In the case of metal housings, the diameter tolerance of the connecting cable may be compensated for by means of beaded or flanged tubular rivets impressed in the bores of the housing wall. Such construction necessitates expensive special riveting machines and, furthermore, known methods of installing and fabricating the rivets are relatively expensive. It is also known to inject plugs or to press or cement them respectively in housing fittings or sockets.

In any case, the prior art has not provided interchangeability between stranded connector connections and plug connections. Moreover, the provision of mass produced seal plugs has not been successfully accomplished.

SUMMARY OF THE INVENTION

Where the housing is to be provided with electrical components and thereafter cast with a casting resin, the art has not provided suitable lead-in devices. Such lead-ins must, of necessity, be liquid tight and correspond to a standard bore size. In addition, such lead-ins should exhibit uniform external diameters in the housing wall such that both cable and plug or tang lead-in units will be exchangeable within a standard housing wall bore. In addition, such lead-in units must comply with standard specifications with regard to surface leakage paths. Moreover, such units should be easy to assemble, self-supporting when installed, and be constructed of self-quenching or insulating material.

It is a principal object of this invention to provide lead-in units or plug members which can fill the above requirements.

This invention provides, in the case of a liquid tight lead-in plug intended particularly for insertion in a housing wall bore, a unit which is exchangeable for cable, wire or tang plugs which are to be connected to electrical devices contained within the housing and where the housing is to be thereafter cast with resin; the lead-in unit is designed as a hollow cylindrically shaped flexible or elastic sealing member which has at least one axial end face closed. The external diameter, in a direction away from the closed axial end face, is initially stepped to reduce the external diameter and is thereafter conically tapered in the manner of a sealing lip.

Due to the shape and flexibility of the self-sealing plug, the lead-in plug unit will engage the housing wall under minimal pressure and will retain its position therein, as well as retaining sealing capability during the casting and curing operations.

For use with cable or wire, the closed end wall of the lead-in plug is formed of flexible material and is centrally or axially perforated. The cable or wire is guided through the perforation. Expediently, a flexible material is chosen for construction of the sealing ring since in this construction the flexible end wall of the sealing ring will be folded back over the cable or wire to both compensate for large diameter tolerances of the cables or wire and to provide the desired sealing around the periphery thereof.

When the member which is to project through the housing wall is a plug tang, according to this invention, the lead-in plug unit is provided with a central cylindrical piece which projects from the interior of the front wall axially into the area which is to be inserted through the housing bore. Preferably, the cylindrical part is formed along with the remainder of the plug unit and the unit is therefore one-piece. The cylindrical part is axially tapered to be reduced in outer diameter away from the wall. The plug tang is centrically guided in the closed front wall and in the cylindrical part. The plug tang can therefore be pressed or injected into the closed front wall and the cylindrical part.

In order to provide for direct soldering to the pressed-in or injected-in plug tang, and in order that the support mounting or lead-in remain stationary without destruction of the seal at the housing wall, it is advisable to manufacture the insulating lead-in plug of a temperature stable plastic.

A lead-in plug unit as described above which is suitable both for wire, cable and plug tangs, can be manufactured with little capital outlay by means of injection molding techniques and can be simply fitted in mass production in both preassembly and in final assembly as dictated by the respective customer's wish. Such lead-in plug units can be inserted into the housing walls prior to the actual casting operation with the lead-ins both providing circumferential guidance and support for the cable, wire or plug tang, while at the same time providing a seal blocking flowage of the casting resin with which the interior of the housing is to be filled.

It is therefore a principal object of this invention to provide a mass producable lead-in plug unit adapted to be inserted in housing bores to provide for lead-in of cable, wire or plug tangs to the interior of the housing prior to casting of electrical components interior of the housing in casting resin.

It is another and particular object of this invention to provide a standardized lead-in plug for insertion into housing walls of electrical housings to provide lead-ins for both cable and wire or plug tangs.

Other objects, features and advantages of the invention will be readily apparent from the following description of preferred embodiments thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 1 is a side plan view of a plug according to this invention equipped with a plug tang.

FIG. 2 is a fragmentary cross-sectional view of the plug of FIG. 1 taken along the line II—II of FIG. 1.

FIG. 3 is an end plan view of the plug of FIGS. 1 and 2.

FIG. 4 is a fragmentary enlarged view of the indicated area shown by the dashed line circle IV of FIG. 2.

FIG. 5 is a view similar to FIG. 2 of an alternate embodiment of the invention specifically adapted for cable or wire.

DESCRIPTION OF THE PREFERRED EMBODIMENTS

A lead-in according to this invention specifically adapted for use in connection with plug tangs is shown in FIGS. 1 through 4. The lead-in is designed as a hollow cylindrically shaped sealing ring 1 closed at one end face. This face, the front face, is designed to be exteriorly positioned with respect to a wall 4 having an opening therethrough. The outer periphery of the sealing ring 1 is reduced at a step to a lesser diameter land 2 which extends axially away from the face and terminates in a frustoconically shaped diameter reducing section 3. The closed face of the sealing ring 1 is provided, on its interior side, with a cylindrical part 5. The cylindrical part 5 may be formed or molded in one piece with the remainder of the unit and is provided with a concially tapered outer periphery whereby there is a space between the inner diameter of the sealing ring 1 axially of the end face and the outer diameter of the part 5.

A plug tang 6 is centrally received in the closed face of the sealing ring and extends through the cylindrical part 5. For receipt of the tang 6, the end face and cylindrical part 5 may be provided with dimensioned openings therethrough. Alternatively, if desired, the tang 6 may be molded in place during the molding of the lead-in plug.

The lead-in plug is inserted in the corresponding bore of the housing wall 4 such that the outerwardly extending flange formed at the step will sealingly engage the outer surface of the housing wall as shown in FIG. 4.

FIG. 5 illustrates a modified form of the invention which includes only the sealing ring 1 and is not provided with the cylindrical part 5. This embodiment is particularly adapted for use with cable and wire. In this case the end face is flexible and is perforated at 9 such that a cable or wire 7 can be passed through the perforation. The perforation is substantially a closed or nonbore forming perforation such that the flexible front wall will be folded back over the cable 7 in the manner of a circumferential lip seal thereby providing sealing for the casting resin which is used to cast in place and to fill the interior of the housing defined by the wall 4.

Although the teachings of my invention have herein been discussed with reference to specific embodiments, it is to be understood that these are by way of illustration only and that others may wish to utilize my invention in different designs or applications.

I claim as my invention:

1. An electrical connector lead-in member for insertion into a bore of a housing wall for liquid tight electrical connection between the interior of the housing and electrical conductors exterior of the housing comprising: first and second portions of said member, the first portion having a circular end wall with an outside axial end surface, a projecting peripheral flange projecting axially from said end wall on a side opposite the axial end surface, the flange having an outer peripheral surface, the outer peripheral surface being radially inwardly stepped axially spaced from the end surface and having a cylindrical portion extending axially from the radially innermost portion of the step terminating in an axially extending radially inwardly tapered peripheral surface portion, the tapered portion terminating in an axial end annular surface on an end of the first portion opposite the outside axial end surface, the flange having an inner diameter, said second portion being interior of the inner diameter of the flange of the first portion and extending axially from the end wall towards the annular end surface and having a tapered outer diameter periphery tapering radially inwardly axially from the circular end wall, the first and second portions being attached together at the circular end wall, a central axially extending opening through the second portion and the circular end wall, and an electrical connector being received in the axially extending opening with a periphery of the electrical connector being in sealing contact with walls of the opening, the first and second portions being formed of an elastic material.

2. A device according to claim 1 wherein the first and second portions are injection molded and the electrical connector is molded in place during the molding of the first and second portions, the second portion being integral with the first portion.

3. A device according to claim 1 wherein the electrical connector is a plug tang.

* * * * *